May 20, 1924.

C. A. HOYT

MOTION PICTURE APPARATUS

Filed June 23, 1920

1,495,021

4 Sheets-Sheet 1

May 20, 1924. 1,495,021
C. A. HOYT
MOTION PICTURE APPARATUS
Filed June 23, 1920 4 Sheets-Sheet 2

Inventor
Charles A. Hoyt,
By Hull, Smith, Brock & West
Attys.

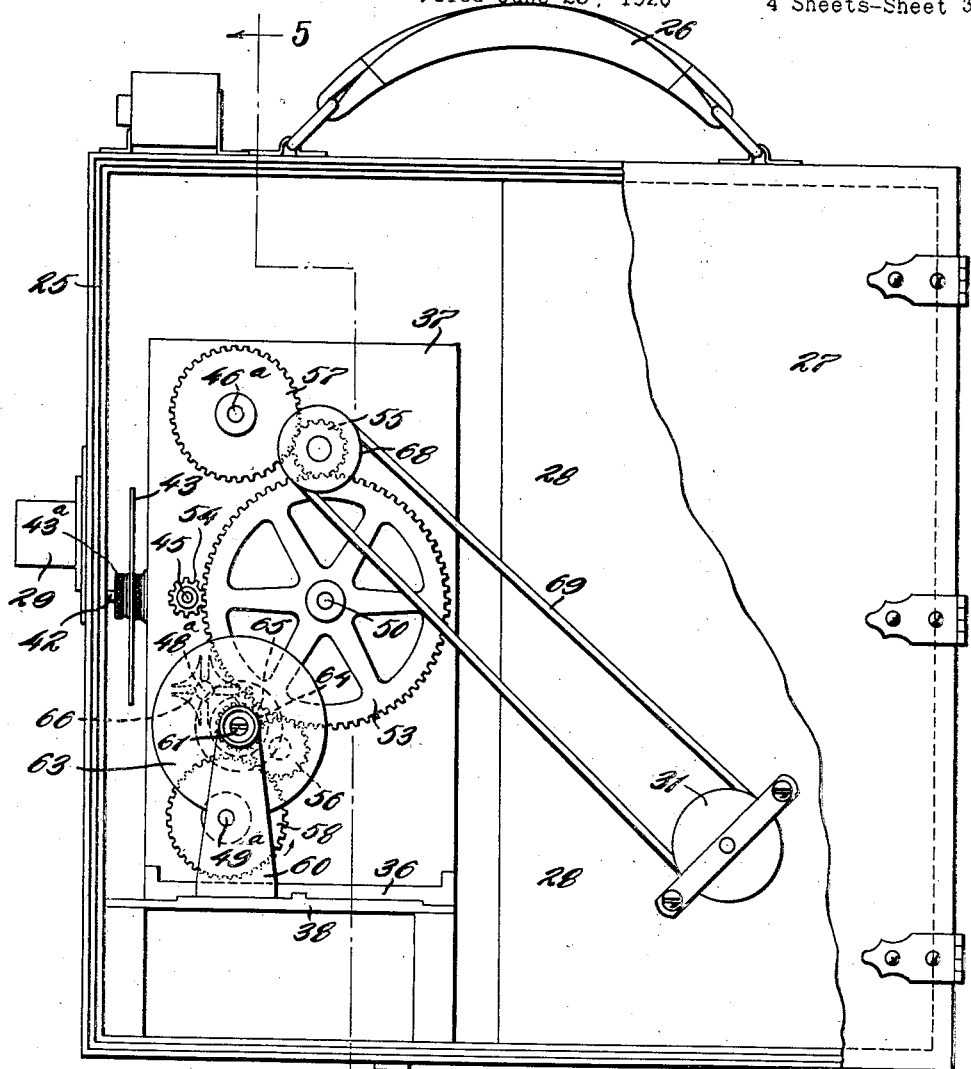
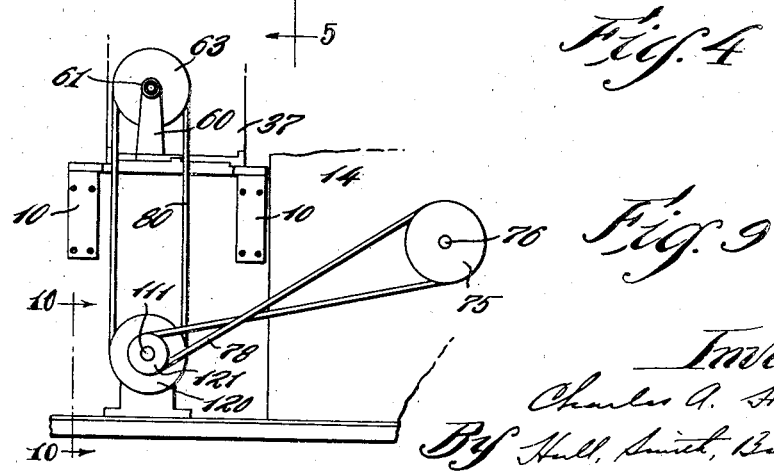

May 20, 1924.
C. A. HOYT
1,495,021
MOTION PICTURE APPARATUS
Filed June 23, 1920
4 Sheets-Sheet 4
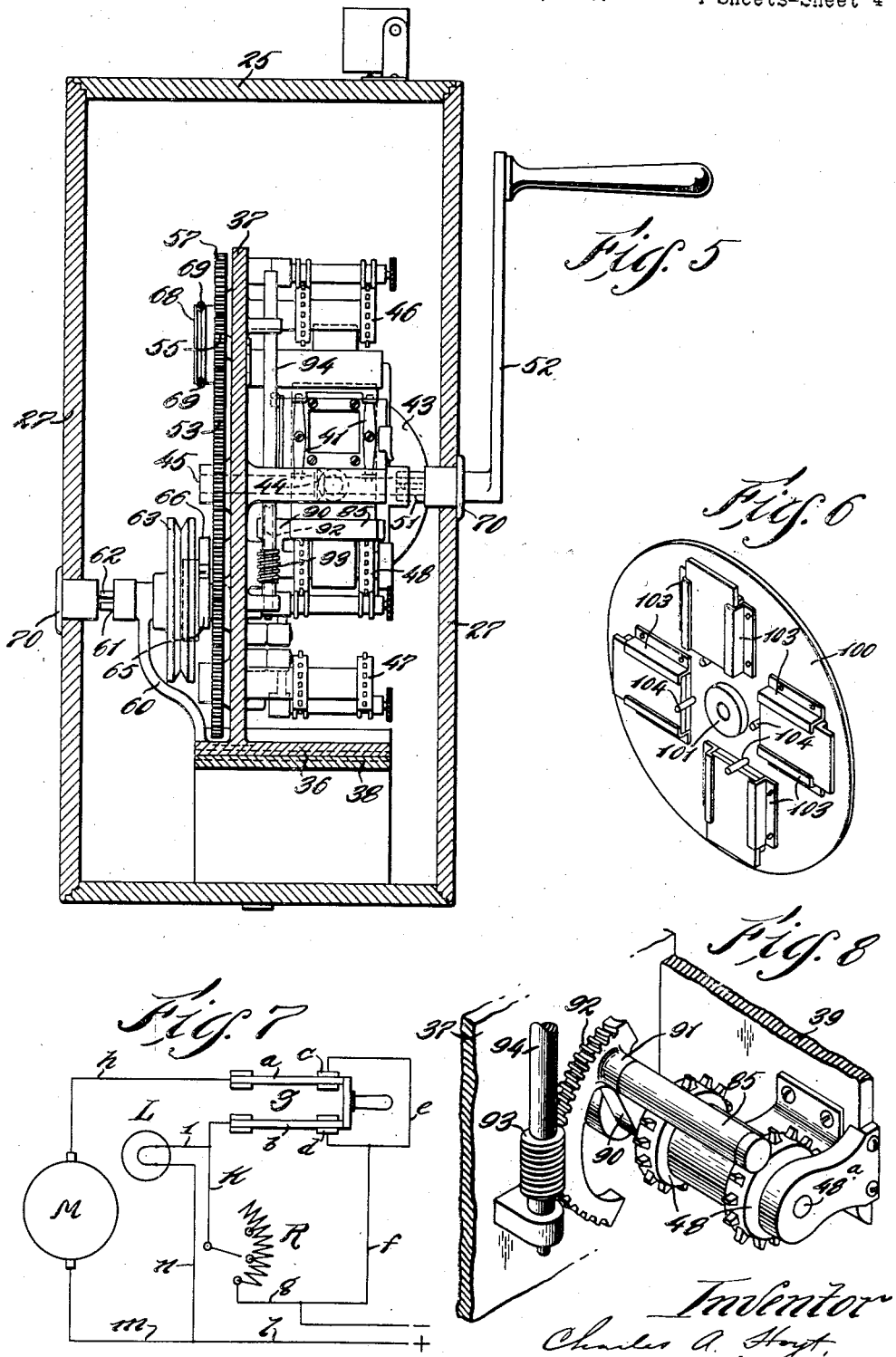

Patented May 20, 1924.

1,495,021

UNITED STATES PATENT OFFICE.

CHARLES A. HOYT, OF CLEVELAND, OHIO, ASSIGNOR TO EDWARD L. FRANTZ, OF CLEVELAND, OHIO.

MOTION-PICTURE APPARATUS.

Application filed June 23, 1920. Serial No. 391,138.

*To all whom it may concern:*

Be it known that I, CHARLES A. HOYT, a citizen of the United States, residing at Cleveland, in the county of Cuyahoga and State of Ohio, have invented a certain new and useful Improvement in Motion-Picture Apparatus, of which the following is a full, clear, and exact description, reference being had to the accompanying drawings.

This invention relates to moving picture apparatus and has for its main objects the provision of a projector whose essential parts are removable and usable as a camera; other objects of the invention are the provision of a new improved and simplified projector of the portable type; the provision of a projector in which the light is automatically dimmed upon any cessation in operation of the film driving mechanism; the provision of new and improved framing devices; the provision of a combined camera and projector which can be employed to take or project either single pictures or rapidly succeeding pictures; while further objects and advantages of the invention will appear as the description proceeds.

Figure 1:
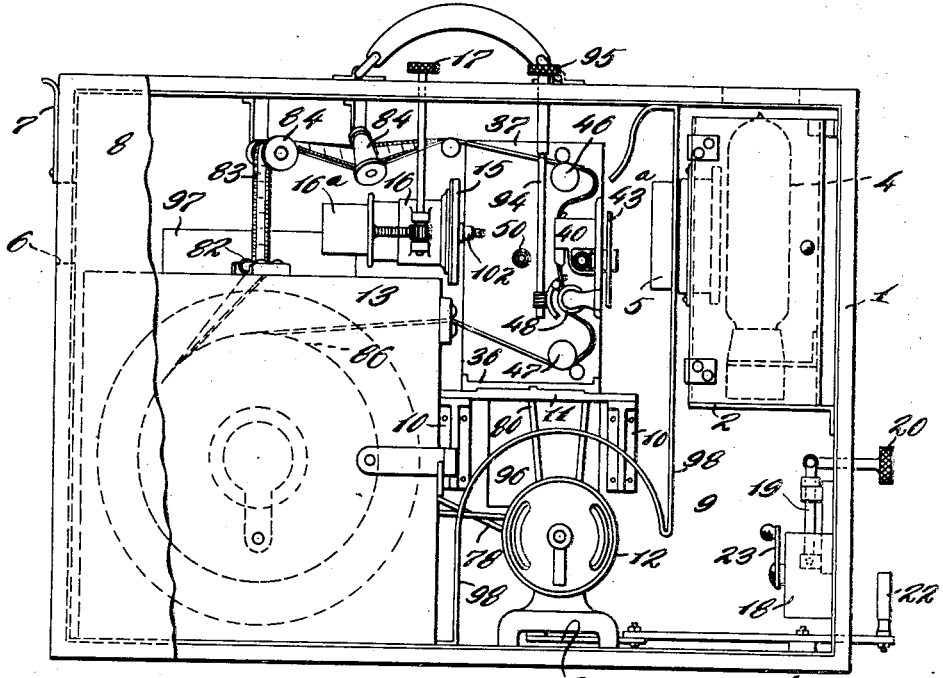
Figure 2:
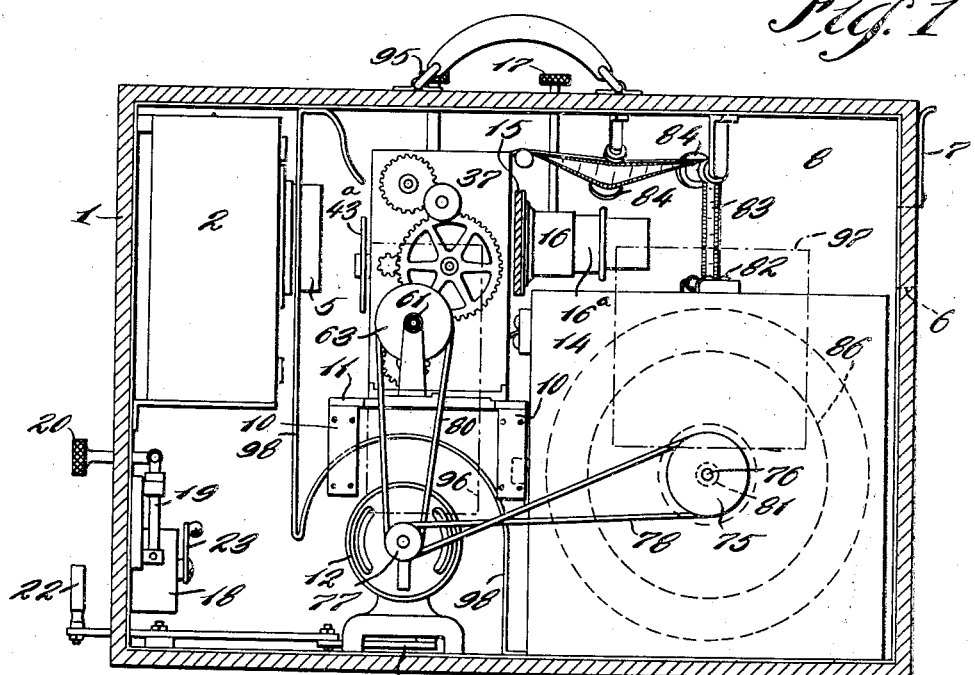
Figures 3, 10:
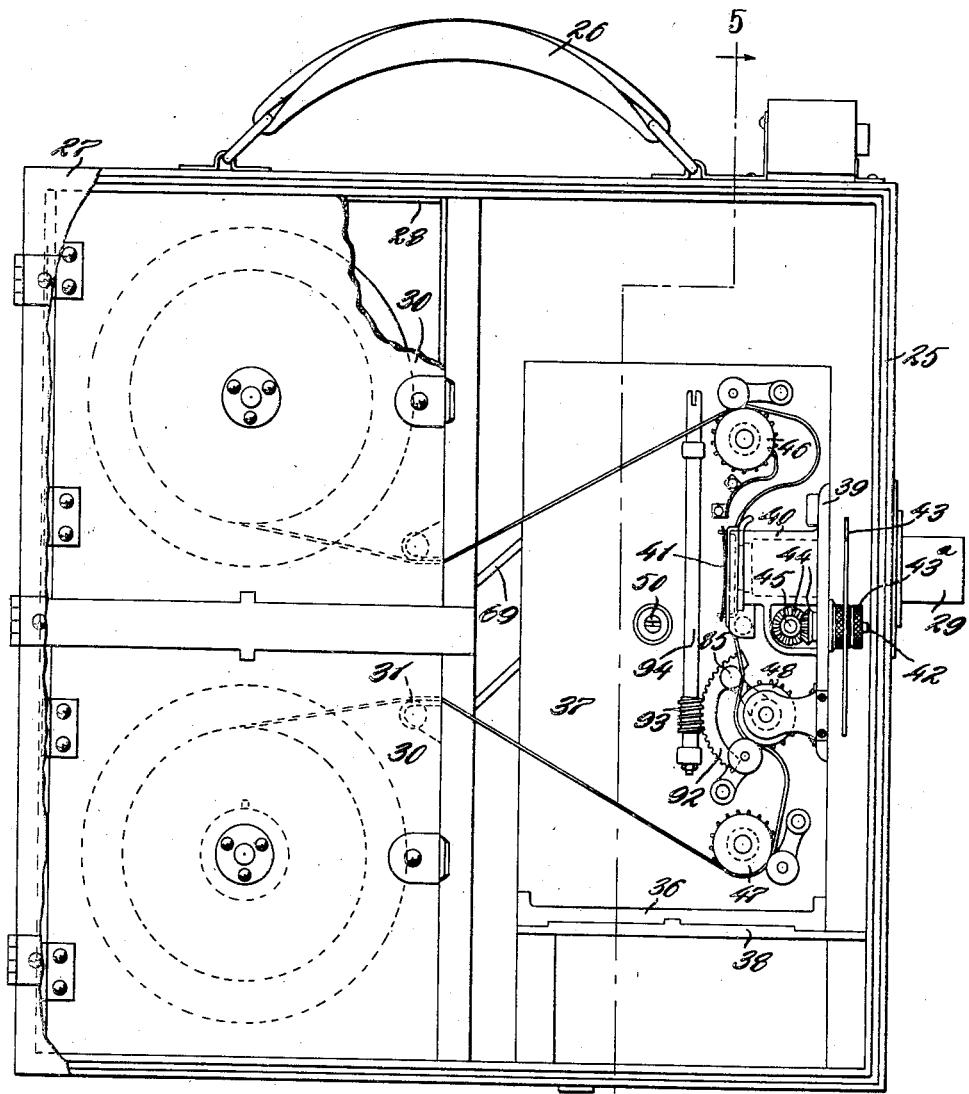

In the drawings accompanying and forming a part of this application I have shown one physical structure in which my inventive idea can be embodied, although it will be understood that this drawing is intended to be illustrative only of the general principles of my invention and not exhaustive of the mechanical structures by which the same can be utilized. Fig. 1 is a front elevation of the projecting box, a portion of the door being removed; Fig. 2 is a rear elevation of the box with the rear wall removed; Fig. 3 is a front elevation of the exposing camera showing the essential mechanism, in place therein, and with the door broken away; Fig. 4 is a rear elevation of the camera with the door broken away to show the essential mechanism; Fig. 5 is a vertical sectional view on the line 5—5 of Figs. 3 and 4; Fig. 6 is a perspective view of a stereopticon attachment adapted for use with my projector; Fig. 7 is a diagram of the electric connections; Fig. 8 is a perspective view of my improved framing mechanism; Fig. 9 is a detail view of a modified form of light controlling apparatus; and Fig. 10 is a sectional view on the line 10—10 of Fig. 9.

Describing by reference characters the parts shown in the drawings, 1 represents the rectangular case or box of the projector which is preferably made in size and shape considerably like a suit-case and is provided with a suitable carrying handle. Located in one end of the case adjacent its upper wall is the lamp house 2 containing a suitable light source, usually an incandescent bulb 4. Secured in the side of the lamp house is a condensing lens 5, and opposite said lens the further wall of the box is formed with an aperture 6 for the path of the light beam, a suitable closure 7 being preferably provided for the last named aperture. The forward wall 8 of the box is preferably hinged to allow access to the works while the rearward wall 9 is rigid and carries the brackets 10—10 on which is mounted the shelf 11, whose location is forward of and beneath the condenser 5. Beneath this shelf is located the electric motor 12 and upon the opposite side of said shelf from the lamp house is the film box located beneath the level of the opening 6 and here shown as constituting a single chamber for the two film reels. Carried by the rear wall 9 above these boxes is a bracket 15 supporting the horizontal cylindrical sleeve 16 in which is slidably mounted the barrel 16ª of the projecting lens, the same being adjustable by suitable means such as a rack and pinion operated by the knob 17 at the top of the box. Beneath the lamp house I have shown the rheostat 18 and motor switch 19, the latter being operable by a knob 20 projecting outside the box. I have also shown the motor as provided with a speed controlling switch 21 governed by a handle 22 located outside the box, while the rheostat is preferably provided with a handle 23 so that the degree of dimming can be varied.

The camera consists of a rectangular box 25 having a carrying handle 26, hinged doors 27—27 at front and back, and a pair of film boxes 28—28, here shown as located one above the other in the part removed from the lens 29. These film boxes are spaced from both doors, being themselves provided upon one side with the hinged lids 30—30 and one of them being provided upon the opposite side with a grooved pulley 31 by which the film is wound up.

Space is provided between the film boxes and lens for the combined exposing and projecting mechanism which in its preferred form is constructed as follows:—

36 represents a base and 37 an upright plate rigid with one side thereof, said base being adapted to fit either the shelf 11 above mentioned or the seat 38 provided inside the camera, Fig. 3. Carried by the frame 37 is the lateral bracket 39 which supports the hollow chamber 40 whose rear end is closed by the film gate 41. Journaled to the bracket 43 parallel to the frame 37 and at one side of the chamber 40 is the shaft 42, to which the shutter 43 is detachably secured in any convenient manner as by the nut 43$^a$ and which is rotated by the miter gears 44 from the shaft 45. Also journaled to the forward face of the frame 37 above and below the gate 41 are the steady continuous film-feed sprockets 46 and 47 and the intermittent sprocket 48 carried by the shafts 46$^a$, 47$^a$ and 48$^a$, respectively. Also journaled in the frame 37 is the main shaft 50, having its forward end provided with suitable means such as the fork 51 for the reception of the operating crank 52, and having secured to its rearward end the gear 53, which meshes with the pinion 54 on the shaft 45 and also with a pair of idler pinions 55 and 56, which in turn drive the pinions 57 and 58 carried by the shafts 46$^a$ and 47$^a$, respectively.

Carried by the base 36 at the rear of the plate 37 is a bracket 60 in which is journaled the drive shaft 61 also preferably formed at its outer end with provisions such as the fork shown at 62 for the reception of the same crank 52. This drive shaft also carries a belt pulley 63, a spur gear 64 meshing with the gear 56 and also carrying the disk portion 65 of a Geneva movement, the star portion 66 of which is carried by the shaft 48$^a$. The rearward face of the plate 37 is also provided with a pulley 68 adapted to be connected to the pulley 31 by a suitable belt 69, this pulley 68 being preferably made integral with the idler 55. A wire-belt is preferably used because it has the double advantage of being self-tightening and of slipping when a predetermined low tension is reached, thus maintaining upon the film during the exposing operation a continual tension regardless of the size of the film roll. The parts are so designed that when the operating mechanism is located inside the camera box the chamber 40 will come into alignment with the lens 29 at the same instant that the pulley 68 comes into the plane of the pulley 31. The doors 27 of the camera box are provided with bushings 70—70 located in alignment with the shafts 50 and 61, respectively, to permit the insertion of the crank 52.

When the mechanism is transferred to the projecting box it is located on the shelf or support 11 with the chamber 40 in line between the condenser and the projecting lens, the shutter 43$^a$ being located upon the side adjacent the condenser, the arrangement being such that the direction of travel of the light beam is the same both in exposing and projecting the pictures. A different shutter 43$^a$ is employed for projecting than for exposing owing to the difference in time of opening necessary. The rear wall of the film box 14 is spaced from the rear wall 9 of the projecting box to afford space for the pulley 75 which is carried by the reel shaft 76 journaled in the box 14 and is belted to a companion pulley 77 on the shaft of the motor by means of the flexible belt 78. The motor shaft is also provided with a second pulley which registers with the pulley 63 of the operating mechanism when the latter is in place and is connected thereto by the belt 80. The film box 13 is provided with a gudgeon 81 here shown as in alignment with the shaft 76 and adapted for the reception of the reel containing the film which is to be exhibited. In the present embodiment this gudgeon consists of a sleeve loosely mounted on the shaft 76, but it may be mounted in any manner and need not even be coaxial with the other reel.

The top wall of the box 13 is provided with a film slit preferably guarded by fire-rollers 82, from which the film 83 passes over suitably shaped and journaled rollers 84—84 whereby it is shifted laterally into the plane of the sprocket 46. After passing over this sprocket it is threaded through the gate 41, past the framing roller 85, which will be described hereafter, around the sprocket 47 and into the film box 14 where it is secured to the reel 86, which is fastened to the reel shaft 76. In order to maintain a uniform tension on this shaft a suitable friction drive is provided preferably by an adjustable friction clutch arranged between the wheel 75 and shaft 76, although a slip-belt forms a fairly good substitute. The framing device heretofore mentioned is illustrated in Fig. 8 and comprises essentially an arm 90 journaled upon an axis concentric with the shaft 48$^a$ and provided at its outer end with a gudgeon 91 carrying the roller 85 and also with a toothed sector 92 meshing with the worm 93 carried by the shaft 94 which is turned by means of a knob 95 located on top of he projecting box near the knob 17. By shifting the position of the roller 85 the position of the film relatively to the aperture can be so adjusted that registration will occur in the intervals of illumination.

The electrical connections are shown in

Fig. 7 wherein M represents the motor, L the lamp, R the rheostat and S the switch. The latter is shown of the knife variety having two knives a and b cooperating with the knife-receiving notches c and d, which are connected together by the conductor e which is attached to one side of the line by the lead f which also has a branch g connected with one terminal of the rheostat. One leg of the switch as a is connected by the lead h to one side of the motor while the other leg b is connected by the lead i to one terminal of the lamp and also by the lead k to the other terminal of the rheostat. The opposite side l of the line is connected to the motor by a branch m and to the lamp by the branch n. When the switch S is closed, current flows through l, m, M, h, a, c, e and f, operating the motor, and also through l, n, L, i, b, d and f, energizing the lamp at its maximum candle power owing to the fact that the resistance in the lamp circuit is at a minimum. Even under these conditions a small portion of the lamp current is deflected through the path k, R, g, and when the switch is opened the circuit through the motor is interrupted as is also the low-resistance circuit through the lamp, while a smaller current continues to flow through the lamp by way of the circuit l, n, L, i, k, R, g. This reduces the danger of inflammation of the film owing to the heat of the light source, while affording a sufficiently large illumination for a still picture. This is highly convenient in the case of an apparatus which is to be used for commercial purposes, inasmuch as it affords ready opportunity for either operating the machine at normal speed or for operating it picture by picture in order to study an operation. In order to effect such single advance of the picture the crank is attached to the shaft 61, one of the doors 96 in the back of the box being opened for the purpose, this door also having the function of permitting access to the pulleys 63 to enable the attachment of the belt. The rear of the box also has a second door 97 therein adjacent to the pulley 76 for the same purpose. The lamp and motor-containing portions of the box are preferably separated from the film-containing portion by a metal partition 98.

In order to enable the projection of stereopticon pictures I have shown a stereopticon carrier of new and convenient type consisting essentially of a circular disk 100 having a hub 101 adapted to fit upon the stud 102 carried by the bracket 15, said disk having a plurality of rectangular apertures arranged radially therein and provided with flanged brackets 103 at opposite sides thereof constituting slideways. I have shown four such openings in this disk although either a larger or smaller number could be employed. The slides are inserted radially as far as permitted by the pins 104. The arrangement here adopted is such that the inner horizontal slide is the one which is exhibited, while the slide opposite thereto is in peculiarly convenient position for removal and replacement.

The projecting device is not necessarily operated by a motor but can be driven by a hand crank applied to the shaft 50. With this arrangement, if it be desired to dim the light automatically when the film stops the arrangement shown in Figs. 9 and 10 may be employed. The motor is replaced by a dynamic device such as the centrifugal governor herein shown, such device being arranged to throw the additional resistance in circuit when the film stops (or when its velocity drops below a predetermined minimum). The governor herein shown is of the type used for phonographs and comprises a sleeve 110 slidable along a shaft 111 under the action of balls 112 carried by the springs 113 connected to the sleeve and shaft. The sleeve carries a disk 114 which when the device is at or near rest engages and displaces a rocker 115 so as to open the contacts 116 and force the current flowing through the lamp to pass through the resistance 117 instead of through the comparatively easy path 118. This device is so adjusted that the intensity of the light is increased as soon as the film movement is sufficiently rapid for safety, yet sufficiently below the normal speed of operation not to be actuated by ordinary inequalities of cranking speed. The shaft also carries the double pulleys 120, 121, the former of which is driven from the pulley 63 by the belt 80 and the latter of which drives the film take-up by the belt 69.

It will be understood that I do not restrict myself to this exact type of governor, controlling resistance, or to this particular location of the same, or to any other detail of construction or arrangement except as specifically recited in the annexed claims.

Having thus described my invention, what I claim is:—

1. In motion picture apparatus, an electrical light source, a condensing lens, a projecting lens, and film advancing mechanism located between said lenses, an electric resistance, electric connections between said light source and resistance and means for automatically increasing the amount of resistance in the circuit with said light source upon stopping said mechanism.

2. In motion picture apparatus, an electrical light source, film advancing mechanism, means for actuating said mechanism, a resistance, and means operative upon any stoppage of said mechanism for automatically throwing said resistance into the light source circuit.

3. In motion picture apparatus, in combination, a light source, mechanism for advancing the film past said source, and means automatically operative upon stopping said mechanism for decreasing the intensity of light upon the film without discontinuing it completely and also operative upon starting said mechanism automatically to increase the intensity of the light thereon.

4. In motion picture apparatus, in combination, an electrical light source, mechanism for advancing film past said source, an electric motor for driving said mechanism, a switch for said motor and means operative upon the opening of said switch for maintaining said light at decreased intensity.

5. In motion picture apparatus, in combination, a light source, mechanism for advancing film past said source, means automatically operative to decrease the intensity of the light upon stoppage of the film and to restore such intensity upon starting the film movement, and means for varying the intensity of the light while the film is at rest.

6. In motion picture apparatus, in combination, a light source, mechanism for advancing film past said source, means automatically operative to decrease the intensity of the light upon appreciable decrease in speed of the film and to restore such intensity upon restoration of the film movement substantially to normal, and means for varying the intensity of the light while the film speed is thus appreciably decreased.

7. A projector for motion pictures comprising a motor, film feeding mechanism, operative connections between said motor and mechanism, an electrically operated light source, a resistance element, and means operative upon stopping the motor for introducing such resistance into circuit with the light source.

8. In motion picture apparatus, in combination, a light source, mechanism for advancing film past said source, means automatically operative to maintain the light at decreased intensity upon appreciable decrease in the speed of the film and to restore the light substantially to normal intensity upon increase of the film speed substantially to normal.

9. In motion picture apparatus, in combination, a light source, mechanism for advancing film past said source, and means automatically operative to maintain said light at decreased intensity upon appreciable decrease in the speed of the film.

10. In motion picture apparatus, a film advancing mechanism including an aperture past which the film is moved, optical elements adapted to focus light through said aperture upon said film for the taking of pictures thereon and means including optical elements and a light source adapted to transmit light through said opening and film for the projection of such pictures, the direction of travel of the light rays through such aperture being the same both in exposing and in projecting.

11. In a cinematographic apparatus, a lamp, an electric circuit including a source of power for supplying current to said lamp, a resistance in said circuit, and means inoperative when the apparatus is at rest and automatically put into operation when the apparatus is in operation providing a shunt across said resistance.

12. In motion picture apparatus, in combination, a light source, mechanism for advancing film past said source, means automatically operative to decrease the intensity of the light upon appreciable decrease in the speed of the film, and means for varying the intensity of the light while the speed of the film is thus appreciably decreased.

In testimony whereof, I hereunto affix my signature.

CHARLES A. HOYT.